(12) United States Patent
Nadeau

(10) Patent No.: US 6,350,290 B1
(45) Date of Patent: Feb. 26, 2002

(54) HIGH TEMPERATURE DUST COLLECTOR

(75) Inventor: Ronald P. Nadeau, Syracuse, NY (US)

(73) Assignee: Griffin Environmental Company, Inc., Syracuse, NY (US)

( * ) Notice: Subject to any disclaimer, the term of this patent is extended or adjusted under 35 U.S.C. 154(b) by 0 days.

(21) Appl. No.: 09/510,698

(22) Filed: Feb. 22, 2000

(51) Int. Cl.[7] .............................................. B01D 46/04
(52) U.S. Cl. ........................... 55/302; 55/341.1; 95/280
(58) Field of Search ......................... 55/283, 302, 337, 55/459.1, 341.1; 95/280, 281, 279; 96/428

(56) References Cited

U.S. PATENT DOCUMENTS

| | | | | |
|---|---|---|---|---|
| 3,630,005 A | * | 12/1971 | Reinauer ...................... | 55/302 |
| 3,726,066 A | * | 4/1973 | Colley et al. ................. | 55/302 |
| 4,764,190 A | * | 8/1988 | Israelson et al. .............. | 55/302 |
| 5,062,867 A | * | 11/1991 | Klimczak .................... | 55/302 |
| 5,180,110 A | * | 1/1993 | Brame ......................... | 55/302 |
| 5,361,452 A | * | 11/1994 | Horn ........................... | 55/302 |
| 5,395,409 A | * | 3/1995 | Klimczak et al. ............. | 55/302 |
| 5,529,592 A | * | 6/1996 | Margraf ....................... | 55/302 |
| 5,690,709 A | * | 11/1997 | Barnes ......................... | 55/348 |
| 6,022,388 A | * | 2/2000 | Andersson et al. ........... | 95/280 |
| 6,149,716 A | * | 11/2000 | Bach et al. ................... | 95/280 |

* cited by examiner

Primary Examiner—David A. Simmons
Assistant Examiner—Minh-Chau T. Pham
(74) Attorney, Agent, or Firm—Wall, Marjama & Bilinski

(57) ABSTRACT

A dust collector for handling high temperature process gases such as air containing dust and dirt. The collector includes a cylindrical filter housing and a clean air plenum mounted over the housing. A series of ceramic filter tubes are mounted in a tube sheet situated between the housing and the plenum and hot dirt containing process air is drawn from the housing into the plenum through the filter tubes. A blowdown system is mounted in the plenum over the filter tube for periodically pulsing a jet of dirt removing air into the filter tubes with sufficient force to remove dirt and dust collected upon the filter tubes. The valves and the inlet piping to the blowdown tubes are protected from the heat generated in the housing by a pair of spaced apart heat shields that are designed to conduct a natural flow of cool ambient air over the pipes. Heat exchanger fins are mounted upon the pipes to further enhance the cooling process.

14 Claims, 8 Drawing Sheets

HIGH TEMPERATURE DUST COLLECTOR

BACKGROUND OF THE INVENTION

This invention relates to a dust collector and, in particular to a dust collector for handling high temperature gases such as air containing fine particulate materials.

In many industrial processes high temperature air is generated that contains dust particles or the like that are environmentally unsafe and thus, cannot be released into the atmosphere. The air temperature in many cases, can exceed 1600° F. and, as a consequence, can have a harmful effect on the component parts of most conventional dust collectors. At particular risk are the diaphragm valves used to control the flow of blowdown air used to dislodge dirt and dust from filter tubes contained in the collector unit. Among other things, these valves contain gaskets that fail when exposed to temperature at or about 450° F. In order to protect the valves from high temperature, it has heretofore been the practice to place an orifice in the blow down tube in front of the valve. This allowed cool ambient air to be pulled into the tube by the negative pressure experienced by the blowdown tube during those periods when it is not in use. Although this method of protecting the diaphragm valves works well for temperatures below 1000° F., it does not provide protection for the valves at the higher temperatures now being generated by many industrial processes.

Further problems are experienced by dust collectors at these higher temperatures. Many of the mating parts of the collector cannot accommodate the thermal deformation produced as the parts are heated to very high temperatures. Differences in the thermal coefficient of expansion of parts at high temperatures can cause failures when the joints between parts cannot accommodate the expansion produced at these high temperatures.

SUMMARY OF THE INVENTION

It is therefore a primary object of the present invention to improve dust collectors.

It is a further object of the present invention to improve dust collectors that handle air or other gases at high temperatures and, in particular, temperatures above 500° F. up to 1500° F.

It is a still further object of the present invention to protect the valves for introducing blowdown air into a dust collector from high internal temperatures experienced by the collector unit.

Another object of the present invention is to provide a dust collector that can accommodate thermal expansion of parts produced at high temperatures.

These and other objects of the present invention are attained in a high temperature dust collector that includes a filter housing containing ceramic filter tubes that empty into a clean air plenum mounted on top of the housing. Horizontally disposed blowdown tubes are mounted in rows within the plenum chamber over the filter tubes and a jet of cleaning air is periodically introduced into each of the filter tubes to dislodge dirt and dust collected on the outside of the filter tubes. Diaphragm valves for controlling the flow of compressed air to the blowdown tubes are located outside of and adjacent to the plenum chamber. The valves are connected to the blowdown tubes by inlet pipes that are arranged to pass through a cooling unit that is adapted to pass cool ambient air around the pipes. The cooling unit consists of a first vertically disposed rear heat shield mounted adjacent to the plenum chamber and a front heat shield that is spaced apart from the rear heat shield. The shields are flat plates that combine to both physically shield the valves from heat produced within the collector and to produce a chimney effect which produces a natural flow of ambient air over the inlet pipes when the pipes are conductively heated. The pipes are equipped with heat transfer fins which helps to dissipate the heat of conduction from the pipes into the flow of ambient air.

Critical joints within the collector are further adapted to accommodate expansion of cojoined parts without causing damage that might normally occur at high temperatures.

BRIEF DESCRIPTION OF THE DRAWING

For a better understanding of these and other objects of the present invention, reference will be made to the following detailed description of the invention which is to be read in connection with the accompanying drawings, in which.

DETAILED DESCRIPTION OF THE INVENTION

Figure 1:
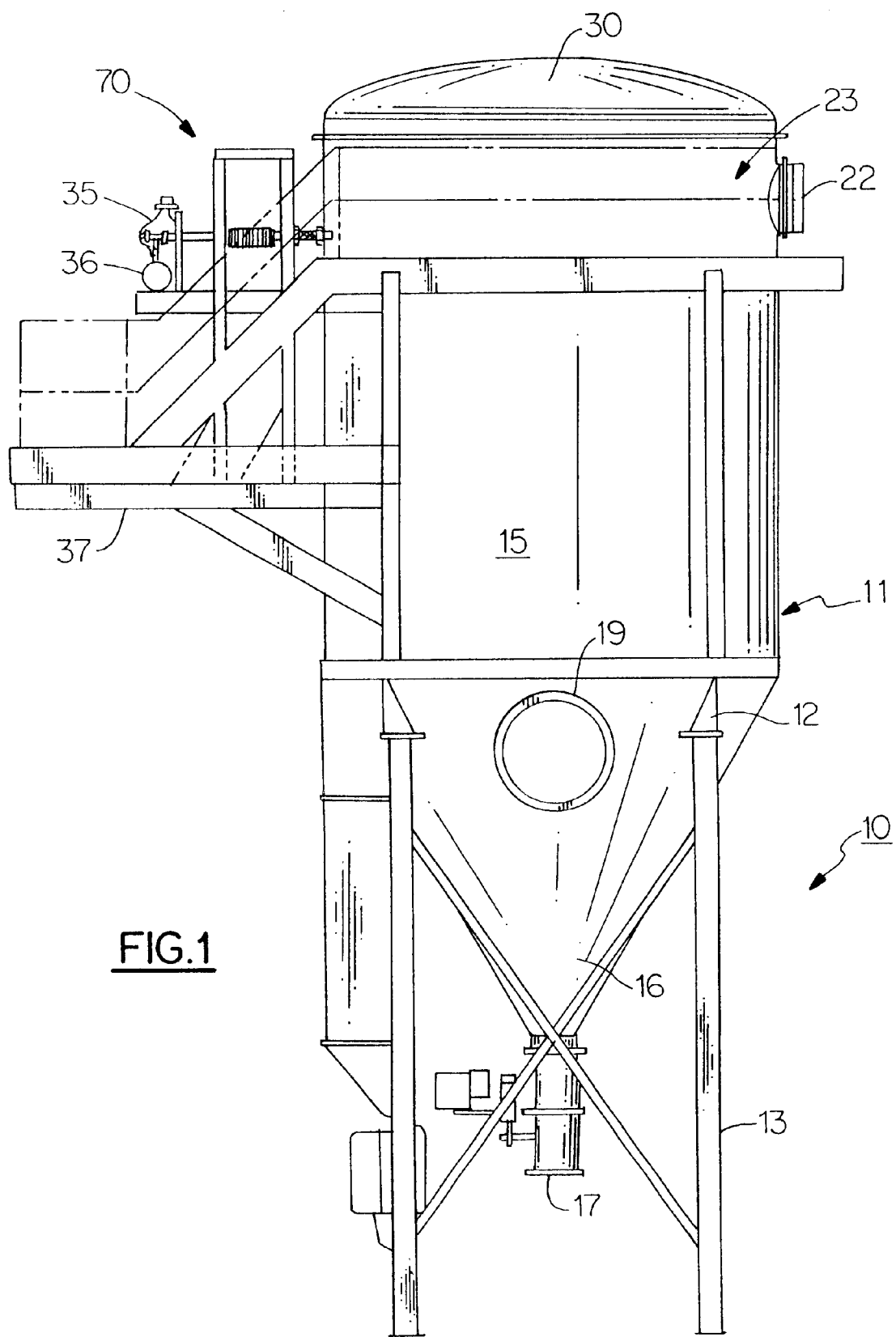
FIG. 1 is a side elevation of a high temperature dust collector embodying the teachings of the present invention.
Figure 2:
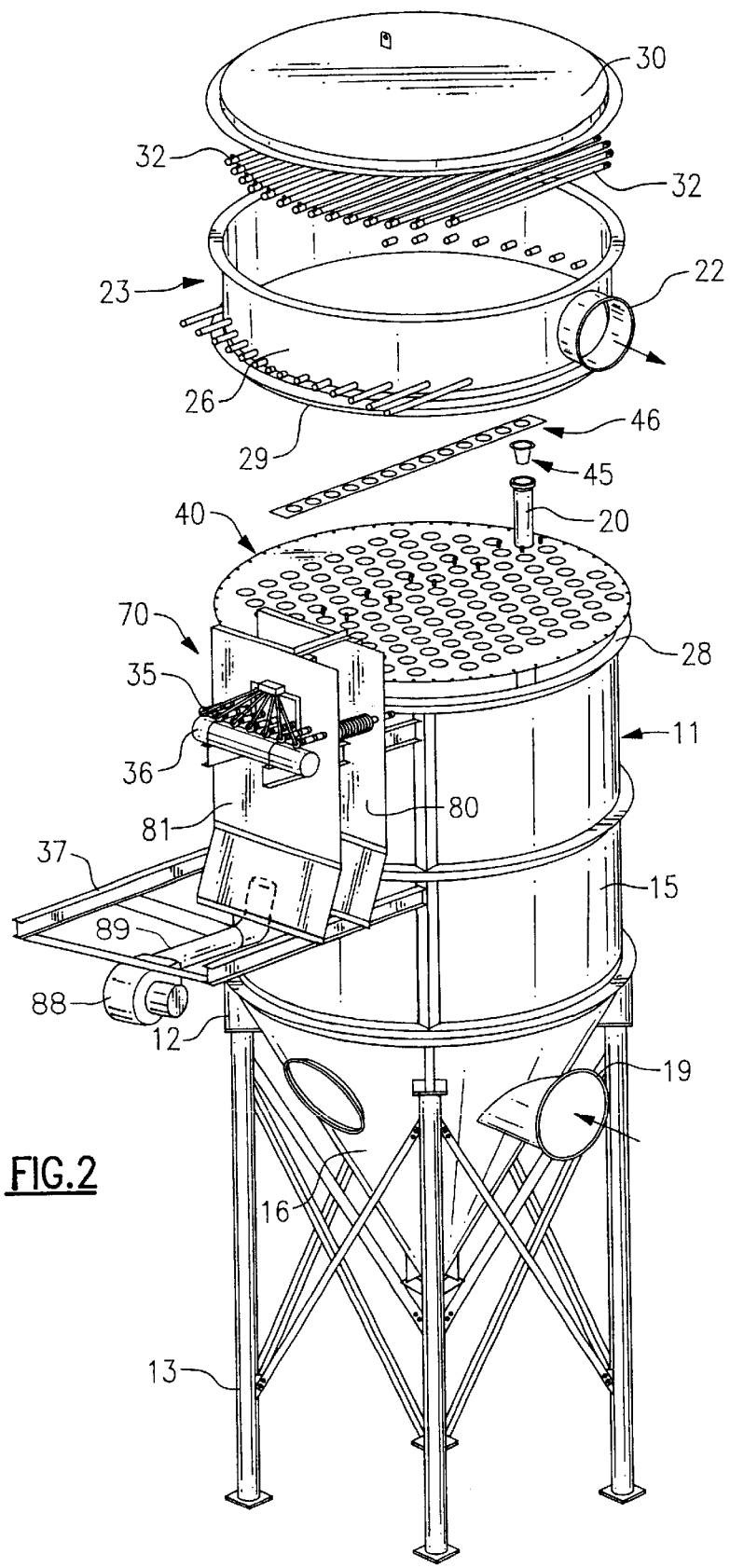
FIG. 2. is an exploded perspective view of the dust collector shown in FIG. 1.
Figure 6:
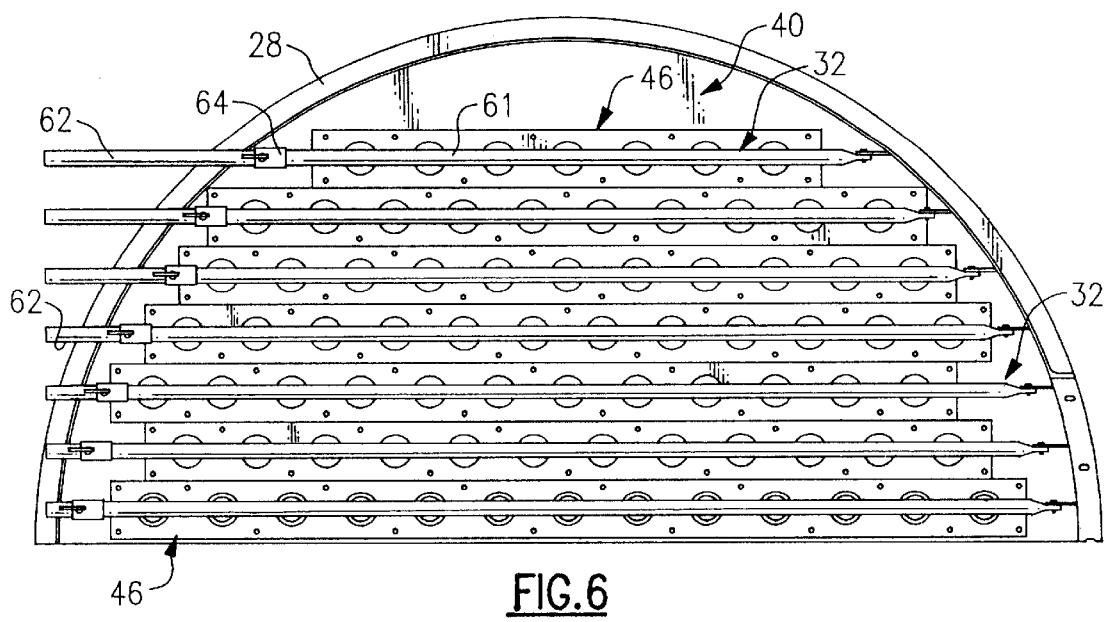
FIG. 6 is an enlarged partial view of the clean air plenum showing the blowdown tubes mounted in rows within the plenum chamber over associated rows of filter tubes.

Turning initially to FIGS. 1 and 2, there is shown a dust collector, generally referenced 10 that embodies the teachings of the present invention. The present dust collector is specifically designed to handle high temperature dust containing air that is exhausted from a high temperature process in order to clean the air of contaminants prior to releasing the air to the atmosphere. As noted above, many current day processes exhaust dirty air at temperatures in excess of 1500° F. which can have a deleterious effect on the collector components because of uncontrolled thermal expansion.

The dust collector 10, includes a filter housing 11 that is supported by four legs 12 resting upon elongated stanchions 13 that are secured in mounting pads (not shown). The filter housing contains a cylindrical main body section 15 that is connected to a conical shaped lower hopper 16 that terminates with a material discharge valve 17. As will be explained in greater detail below, dirt, dust and other particulate matter that is separated from the air flowing through the housing is directed downwardly into the collection hopper where it can be removed either automatically or manually. A cylindrical housing is preferred because it will expand more uniformly under a thermal load than a rectangular housing.

Air containing dirt and dust is brought into the upper part of the hopper through an inlet duct 19 and is drawn through a series of filter tubes 20 mounted in parallel rows within the housing by an induced draft fan 21. The induced draft fan 21 is connected to an outlet duct 22 located in a clean air plenum 23 that is mounted over the filter housing.

Figure 7:
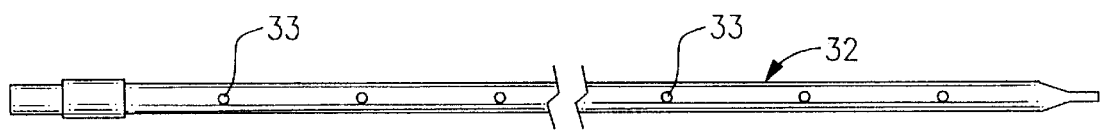
FIG. 7 is a bottom view of one of the blowdown tubes showing the location of nozzles for directing cleaning air into the filter tubes.

The clean air plenum 23 includes an annular body 26 that is connected to the housing by mating bolting flanges 28 and 29 and a dome shaped top cover 30 that is similarly attached to the top of the annular body. A series of blowdown tubes 32 are mounted in the clean air plenum chamber over each row of filter tubes. As shown in FIG. 7, each tube contains a series of nozzles 33 that are arranged periodically to direct a pulse of air into each tube in a given row with sufficient force to dislodge any dirt or dust that might adhere to the outer surfaces of the filter tubes during the air cleaning process.

The introduction of cleaning air into the filter tubes is controlled by a series of diaphragm valves 35 located outside of the collector which are adapted to deliver a pulse of air from header 36 to a selected blowdown tube or tubes in a given sequence that will allow the dust removal process to operate continuously while dirt and dust is being moved from one or more rows of filter tubes. Access to the valves and the blowdown air delivery system is provided by a platform 37 secured to the superstructure of the housing. As noted above, the valves all contain diaphragms and other parts that can be damaged if exposed to the high operating temperatures within the collector. These high temperatures can be conducted to the valves through the blowdown.

Figure 3:
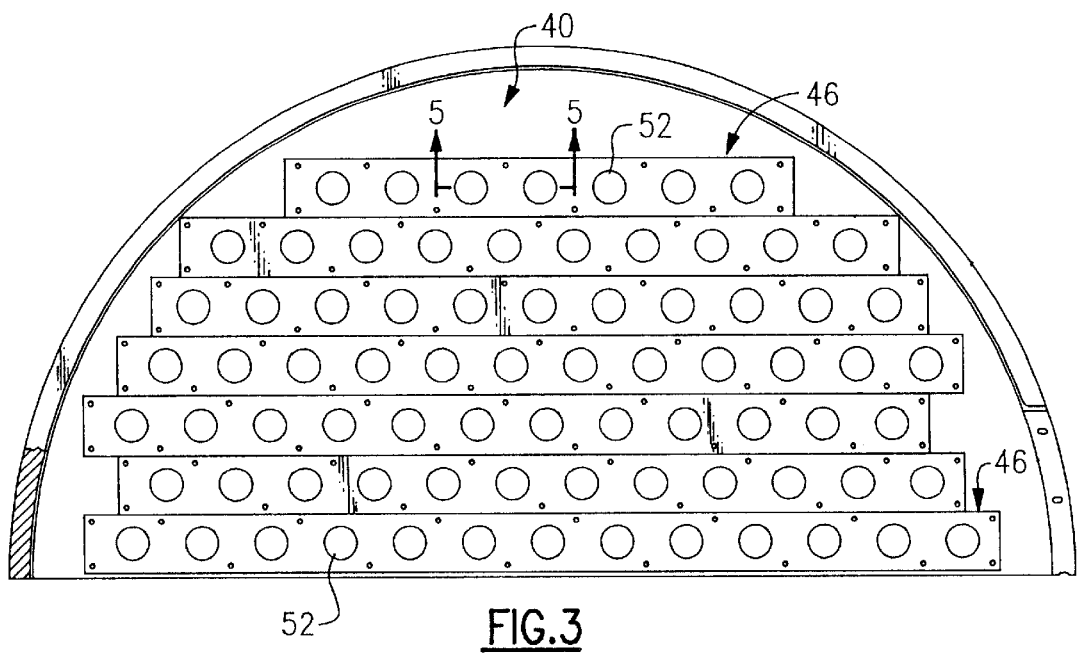
FIG. 3 is a partial enlarged top view showing the tube sheet and locking strip mounted in the top of the filter housing of the dust collector.
Figure 4:
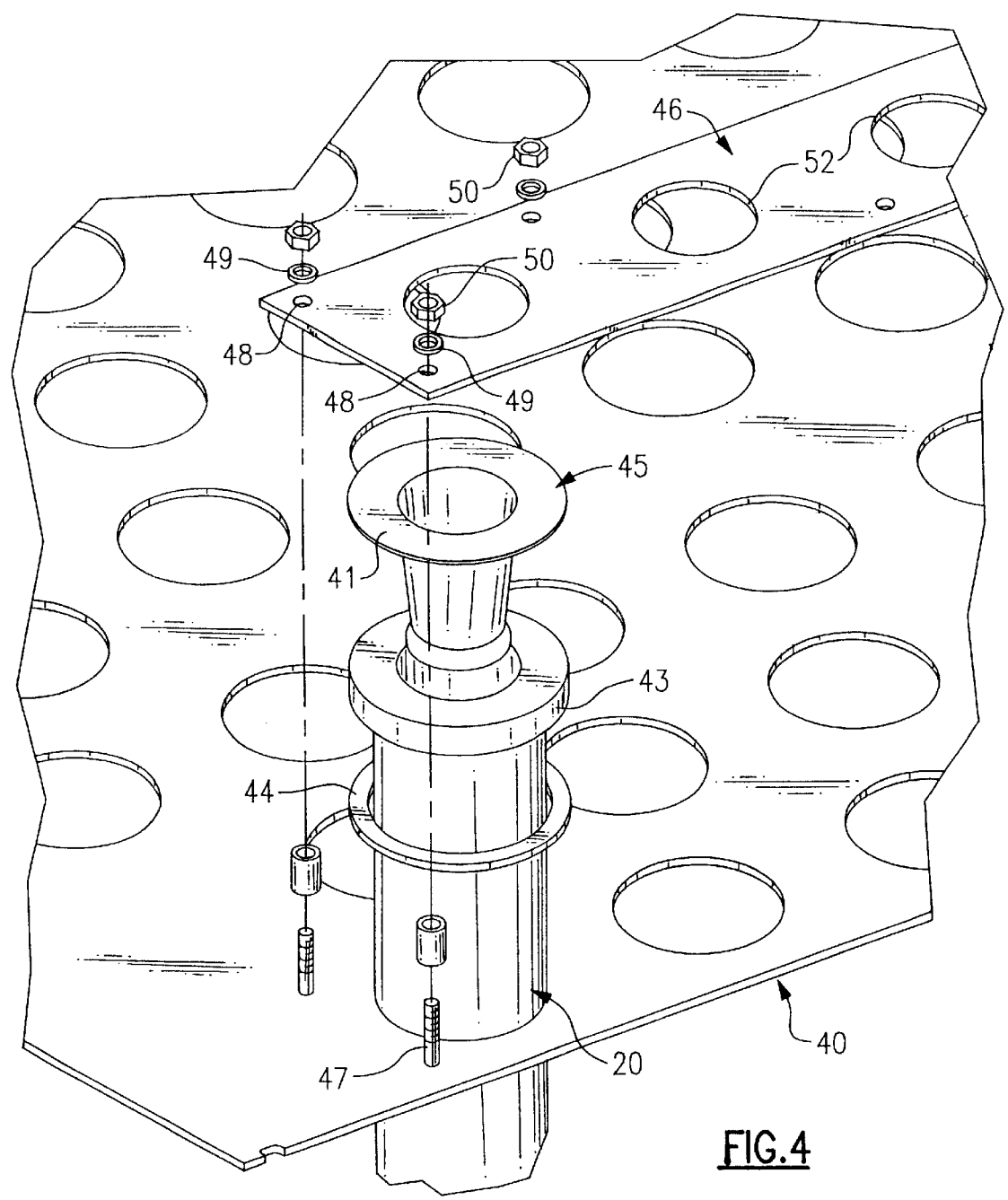
FIG. 4 is a further enlarged exploded view in perspective illustrating the mounting of a filter tube in the tube sheet.
Figure 5:
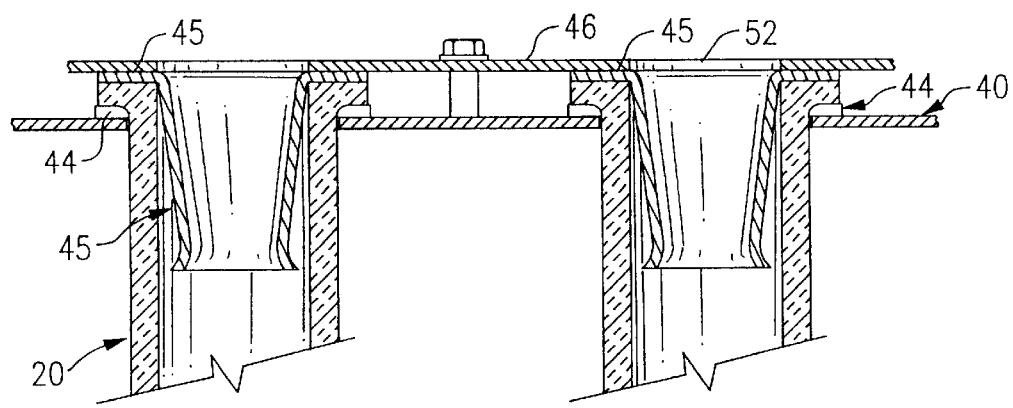
FIG. 5 is a partial side elevation in section taken along lines 5—5 in FIG. 3 illustrating the filter tubes assembled in the tube sheet.
Figure 13:
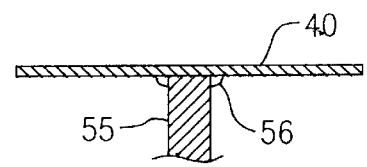
FIG. 13 is a sectional view taken along lines 13—13 in FIG. 12.
Figure 12:
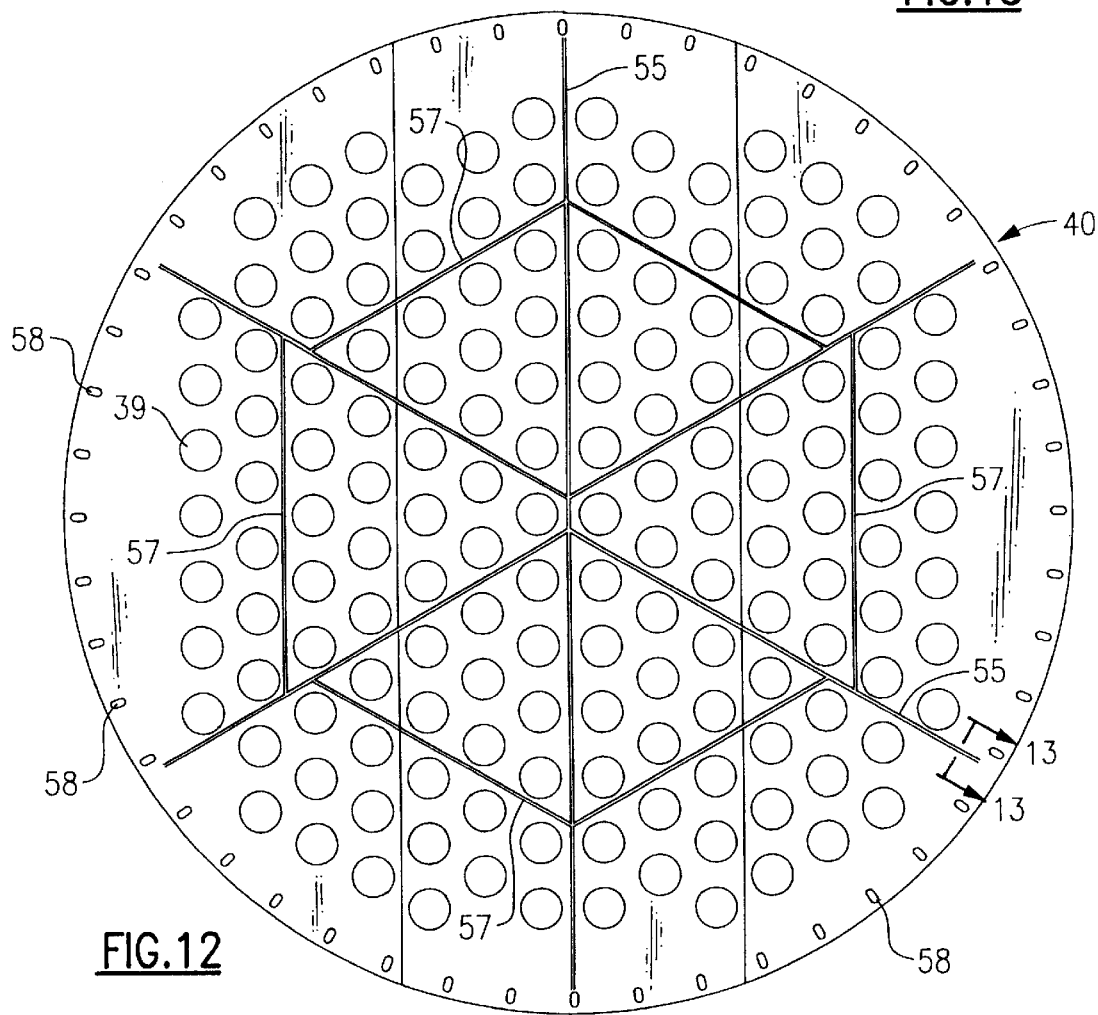
FIG. 12 is an enlarged bottom view of the tube sheet illustrating a reinforcing network for the tube sheet.
Figure 8:
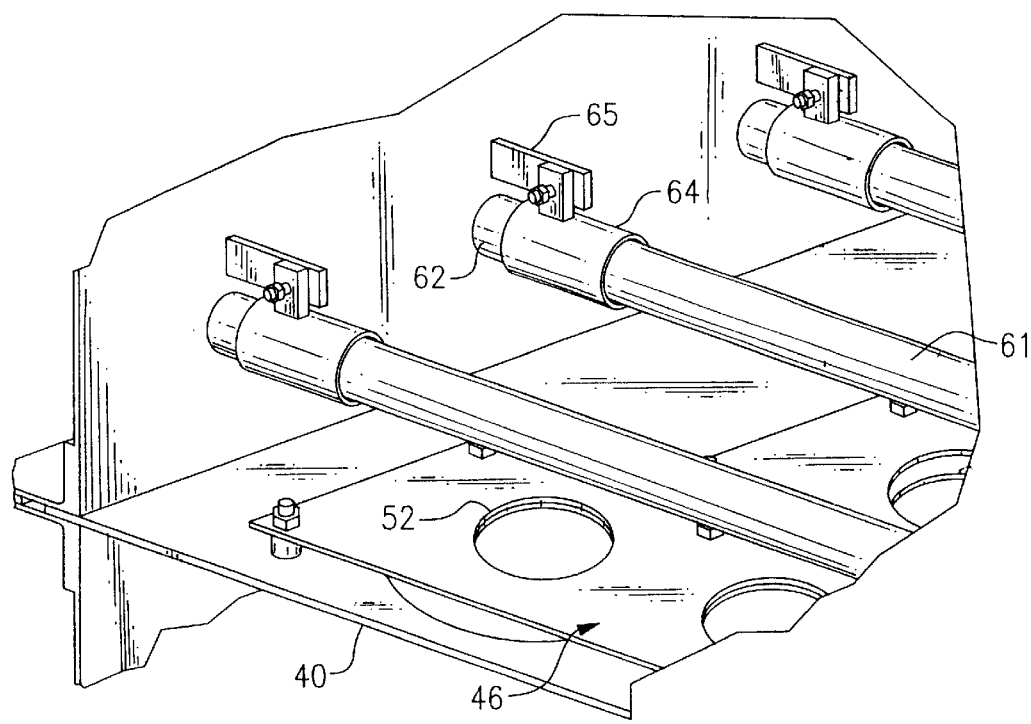
FIG. 8 is a partial enlarged perspective view illustrating supports used to mount the proximal ends of the blowdown tubes within the plenum chamber.

With further reference to FIGS. 3–5, a tube sheet 40 is mounted in the top of the dust collector housing over the lower bolting flange 28. A bottom view of the tube sheet 40 is shown in FIG. 12. A series of stiffeners 55 extend outwardly in a radial direction from the center of the tube sheet and are welded in place by spot welds 56 as shown in FIG. 13 so that the stiffeners can expand with the tube sheet as the temperature inside the collector increases. Secondary stiffeners 57 are welded between the radially disposed stiffeners to provide further reinforcement to the tube sheet. A number of radially disposed holes 58 are spaced about the periphery of the tube sheet that are aligned with circular holes in the mounting flanges which again allows the tube sheet to expand safely under thermal loads. Preferably, the tube sheet and the stiffeners are fabricated from materials having about the same coefficient of thermal expansion. Woven glass gaskets 42 and 43 are placed between the tube sheet and the upper and lower bolting flanges as shown in FIG. 10.

A series of filter tubes 20 made of a ceramic material are mounted in parallel rows within the tube sheet. Each ceramic tube contains an elongated cylindrical body 20 that extends downwardly into the filter housing. The lower end of each filter tube is closed by an end wall while the upper end remains open and is equipped with a radially expanded flange 43 that rests against the top surface of the tube sheet. An annular gasket 44 encircles each tube and is positioned between the end flange and the tube sheet to close the tube sheet opening in assembly. A venturi tube 45 is passed into the open end of each filter tube and a locking strip 46 is passed over venturi tubes in each row. The locking strip is secured to the tube sheet by studs 47 that are secured in the tube sheet. As illustrated in FIG. 4, the studs 47 are arranged to pass upwardly through holes 48 provided in the locking strip and a lockwasher 49 is passed over the stud. A nut 50 is threaded onto each stud and is tightened down to lock the venturi tubes and filter tubes contained in each row in place. The locking strip contains a series of spaced apart holes 52 that are axially aligned with the openings in the filter tubes so that air passing through the filter tubes can be discharged through the venturi tubes into the clean air plenum.

The ceramic filter tubes have a porosity such that air can pass freely through the walls of the tubes, but fine particles such as dust and the like cannot. These fine particles are collected on the walls of the filter tubes and, as noted above, must be periodically removed in order for the dust removal process to proceed efficiently. To this end, a blowdown system is installed to periodically pass a jet of air downwardly into the filter tubes to dislodge the particles from the walls of the tubes. The dislodged dust and dirt falls into the hopper 16 of the filter housing and is discharged through valve 17 at the bottom of the hopper.

Figure 9:
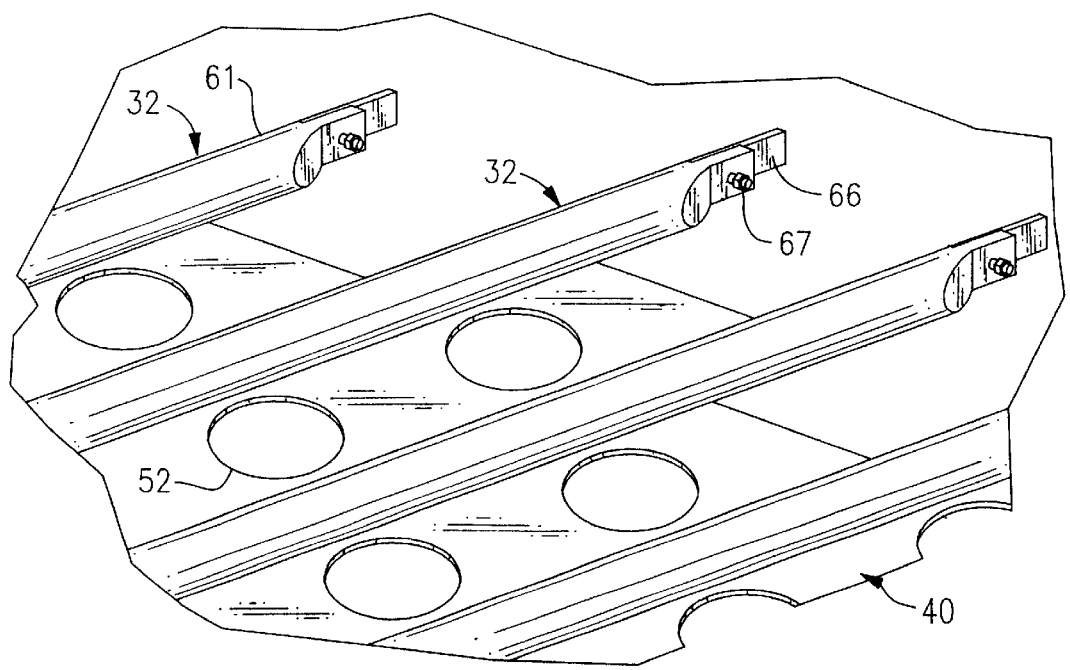
FIG. 9 is a partial enlarged perspective view illustrating the distal ends of the blowdown tubes attached to the inner wall of the plenum chamber.
Figure 10:
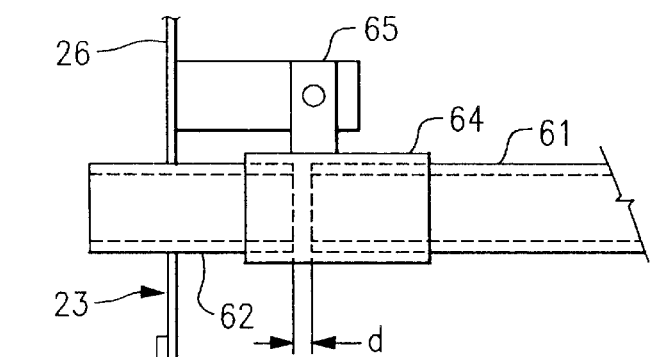
FIG. 10 is a partial side elevation showing a connector for supporting the proximal end of one of the blowdown tubes in assembly.

Turning now more specifically to FIGS. 8–11, there is shown the collector blowdown system in greater detail. Each blow down tube 32 contains two sections, a first elongated internal section 61 and a shorter transition section 62 that are cojoined in assembly by a sleeve 64 (FIG. 10). The sleeve is secured in a bracket 65 secured to the inner wall of the plenum. Both sections of the blowdown tube are slidably received within the sleeve and a gap (d) is provided between the adjacent ends of the two sections. The gap is sufficiently wide to permit the blowdown tubes to expand freely when subjected to high internal air temperatures. The opposite end of each blowdown tube is crimped closed as illustrated in FIG. 9 and the crimped ends of each tube is secured in a mounting bracket 66 by a threaded fastener 67.

Figure 11:
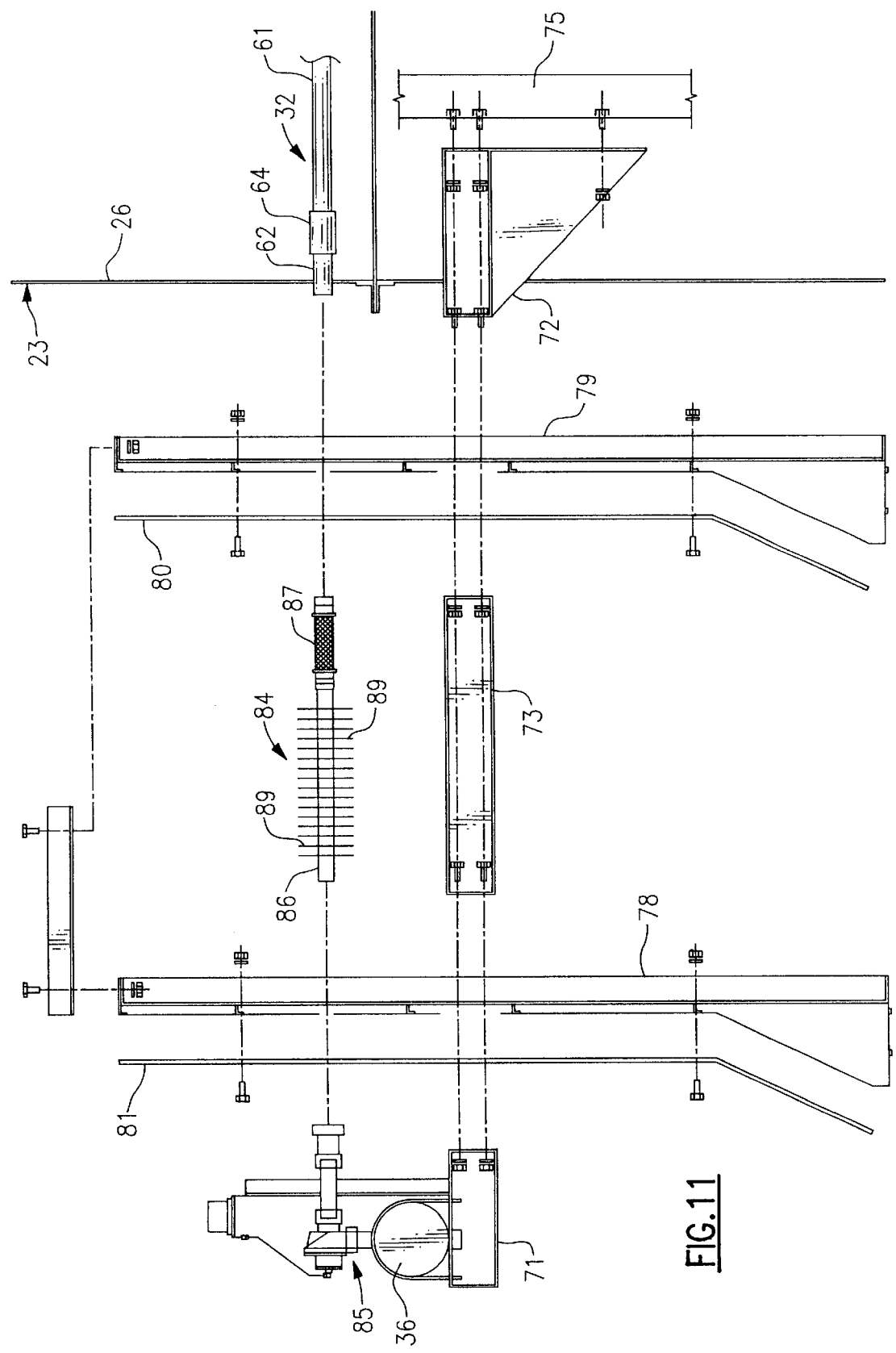
FIG. 11 is an exploded side elevation illustrating the cooling and mounting arrangement for the blowdown air delivery system.

FIG. 11 is an enlarged exploded partial side elevation of the blow down system, generally referenced 70 (FIG. 2). The air supply unit is mounted outside the dust collector upon platform 37. An air header 36 is mounted upon a pair of support members 71 which, in turn, are connected to mounting brackets 72 by means of horizontally disposed beams 73. The brackets are, in turn, fastened to risers 75 that are part of the dust collector superstructure. A pair of spaced apart heat shields are attached to vertical metal studs 78 and 79 that are connected to the beams 73. The heat shields include a first inner shield 80 mounted adjacent to the outer wall of the dust collector and an outer heat shield 81 parallelly aligned with the inner shield to create a chimney like structure.

An inlet supply pipe 84 connects the transition tube 62 of each blowdown tube to one of a series of diaphragm control valves generally referenced 35. Each inlet supply pipe includes a rigid cylindrical section 86 and a flexible braided hose section 87 that is constructed of stainless steel. The proximal end of the pipe is connected to one of the diaphragm valves while the proximal end is connected to a transition tube. The braided section of pipe permits the inlet pipe to expand sufficiently under the high temperatures induced by the process air contained within the collector to prevent the cojoined part from being damaged. As best seen in FIGS. 1 and 2, the rigid cylindrical section of the inlet pipe is arranged to pass through suitable openings in the heat shields. That portion of the pipes that is situated between the two heat shields is equipped with radially extended fins 89 which are capable of rapidly and efficiently transferring heat energy from the pipes into the surrounding ambient.

The bottom section of each heat shield is turned outwardly away from the filter bag housing into a zone of ambient air that is cooler than that found immediately adjacent to the housing. Any heat that is conducted out of the dust collector by the blowdown system is rejected by the heat transfer fins into the air located between the heat shields. The heated air rises upwardly between the shield thus drawing cooler air upwardly from beneath the shield into the inlet pipe region thus aiding in the cooling process. A forced air fan 88 (FIG. 2) may be coupled via a supply line 89 to the heat shield assembly which provides a flow of cooling air between the shield to further cool the blowdown tube units.

Figure 14:
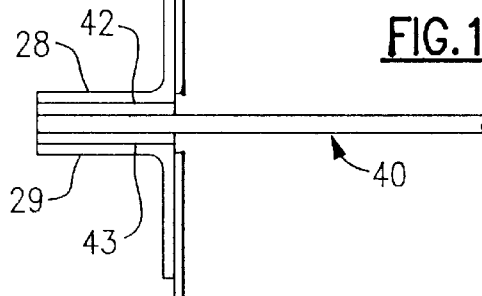
FIG. 14 is an enlarged partial side elevation showing the mounting arrangement for connecting the legs of the dust collector to the elevated support stanchions of the unit.
Figure 14:
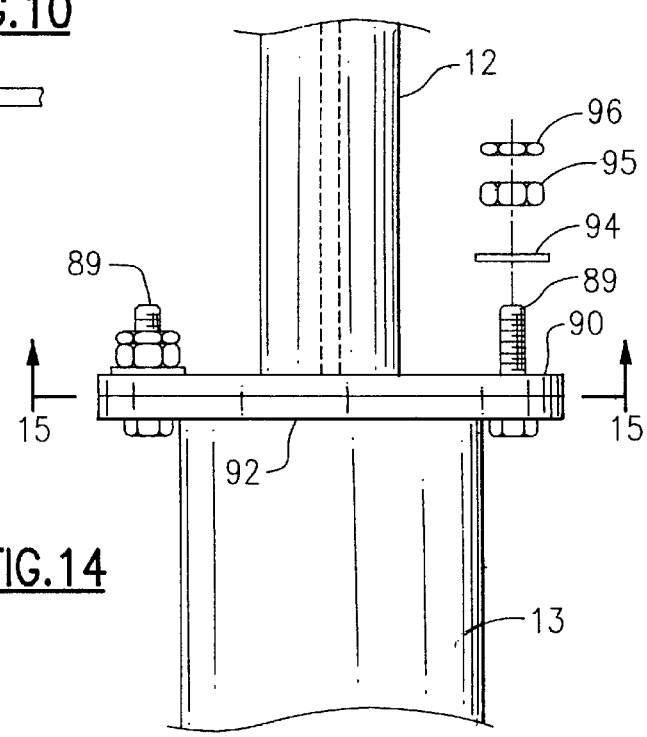
Figure 15:
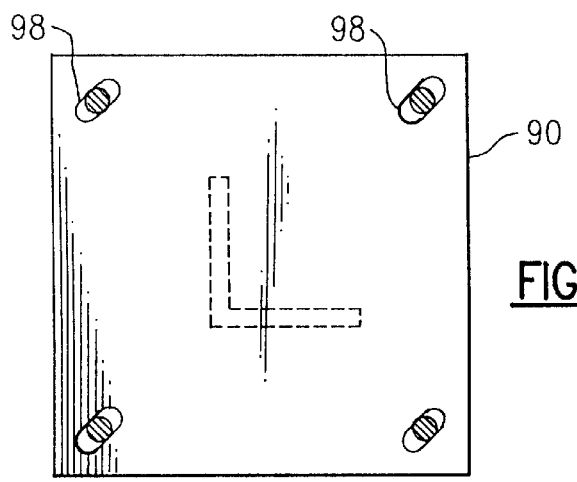
FIG. 15 is a section taken along lines 15—15 in FIG. 14.

The integrity of the dust collector's support structure is also protected from the high temperature induced in the housing by the process gas or gases. As illustrated in FIGS. 14 and 15, the support legs 12 of the housing are provided with an upper mounting flange 90 that rests, in assembly, against a mating lower flange 92 carried on top of the stanchions 13. The flanges drawn together by bolts that pass upwardly through the lower flange into the upper flange. A washer 94, a bolt 95 and a locknut 96 are passed onto the bolts and the nuts tightened down to secure the collector legs to the stanchions. The mounting holes 98 in the upper flanges are all elongated radially with the center of the housing as illustrated in FIG. 15 to again permit the flanges to expand safely under induced thermal loads.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. Apparatus for removing particulate contaminants from high temperature process gases that includes:
   a dust collector that includes a filter housing and a clean air plenum chamber that is mounted on top of said filter housing,
   a tube sheet separating said plenum chamber from said filter housing,
   a series of ceramic filter tubes vertically disposed in said housing in parallel rows, said filter tubes passing upwardly through said tube sheet and opening into said plenum chamber,
   air handling means for drawing hot dust containing air into said filter housing, through said filter tubes and exhausting said air from said plenum chamber whereby said dust is collected upon said filter tubes,
   a horizontally disposed blowdown tube mounted in said plenum chamber over each row of filter tubes for passing a jet of air periodically downwardly into said filter tubes in each of said rows whereby dust collected on the filter tubes is removed,
   a horizontally disposed inlet pipe mounted outside the plenum chamber in axial alignment with each of said blowdown tubes, said inlet pipe having a distal end that is coupled to a proximal end of one of said blowdown tubes and a proximal end that is connected to a valve for reciprocally introducing a jet of air into said blowdown tube, and
   cooling means for passing ambient air over the inlet pipes, said cooling means including a horizontally disposed flat rear heat shield located adjacent to the dust collector and a spaced apart flat front heat shield parallelly aligned with the rear heat shield and being arranged so that said inlet pipes extend through said heat shields.

2. The apparatus of claim 1 wherein a bottom section of each heat shield is angled away from the dust collector into a region of cooler ambient air whereby cool ambient air is conducted upwardly between said heat shield when the temperature of the air about the inlet pipes is heated by said pipes.

3. The apparatus of claim 2 that further includes heat exchanger fins mounted upon each inlet pipe located within the space between said heat shields.

4. The apparatus of claim 1 wherein the distal end of each inlet pipe is connected to the proximal end of an associated blowdown tube by a flexible connector.

5. The apparatus of claim 4 wherein said flexible connector is formed of a section of stainless steel braided hose.

6. The apparatus of claim 5 wherein each blowdown tube contains a transition section that passes through the plenum chamber wall and an elongated section that passes over a row of filter tubes.

7. The apparatus of claim 6 that further includes a cylindrical connector that is axially aligned with the transition and elongated sections of each blowdown tube and in which the opposed ends of the transition section and the elongated section of the blowdown tube are slidably received.

8. The apparatus of claim 7 that further includes a bracket means for mounting each cylindrical connector to an inner wall of the plenum chamber.

9. The apparatus of claim 8 wherein a gap is provided within the cylindrical connector between the opposing ends of the transition and elongated sections of each blowdown tube.

10. The apparatus of claim 1 wherein said tube sheet further includes a series of radially disposed stiffening bars.

11. The apparatus of claim 1 wherein said plenum chamber is secured to the filter housing by mating bolting flanges.

12. The apparatus of claim 11 wherein said tube sheet includes a rim that is located between said bolting flanges and said rim contains a series of radially extended slotted holes through which flange mounting bolts pass.

13. The apparatus of claim 12 that further includes heat resistance gaskets mounted between the bolting flanges and the rim of said tube sheet.

14. The apparatus of claim 1 wherein said filter housing contains mounting legs that are connected to vertically disposed stanchions by threaded fasteners and each leg includes a mounting pad containing slotted holes for receiving said threaded fasteners therein, said slotted holes being radially aligned with the center of the filter housing.

* * * * *